United States Patent
Ono et al.

(10) Patent No.: US 11,010,604 B2
(45) Date of Patent: May 18, 2021

(54) DOCUMENTATION DETERMINATION DEVICE AND DOCUMENTATION DETERMINATION PROGRAM

(71) Applicant: AGATHA INC., Tokyo (JP)

(72) Inventors: Nami Ono, Tokyo (JP); Chiemi Kamakura, Tokyo (JP); Guillaume Gerard, Tokyo (JP)

(73) Assignee: AGATHA INC., Tokyo (JP)

(*) Notice: Subject to any disclaimer, the term of this patent is extended or adjusted under 35 U.S.C. 154(b) by 0 days.

(21) Appl. No.: 16/912,570

(22) Filed: Jun. 25, 2020

(65) Prior Publication Data

US 2020/0410232 A1    Dec. 31, 2020

(30) Foreign Application Priority Data

Jun. 26, 2019    (JP) .............................. JP2019-119078

(51) Int. Cl.
*G06K 9/00*    (2006.01)
*G06T 7/11*    (2017.01)
(Continued)

(52) U.S. Cl.
CPC ....... *G06K 9/00483* (2013.01); *G06F 40/194* (2020.01); *G06K 9/00456* (2013.01);
(Continued)

(58) Field of Classification Search
CPC .... G06K 9/00442–00483; G06K 9/325; G06T 7/11; G06T 2207/30176; G06F 40/194
See application file for complete search history.

(56) References Cited

U.S. PATENT DOCUMENTS

2005/0154703 A1* 7/2005 Ikada .................... G06F 40/194
2007/0030519 A1* 2/2007 Tojo ........................ G06F 16/50
                                                                   358/1.18
(Continued)

FOREIGN PATENT DOCUMENTS

JP    H04-096283 A    9/1992
JP    H06-096283 A    4/1994
(Continued)

OTHER PUBLICATIONS

Japanese Office Action dated Jul. 16, 2019, as received in application No. 2019-119078.
(Continued)

*Primary Examiner* — Sean T Motsinger
(74) *Attorney, Agent, or Firm* — Maschoff Brennan

(57) ABSTRACT

A CPU acquires bibliographic information of attached documents listed in an application document and bibliographic information given in each of the attached documents. If the application document or any of the attached document linked to the application document are in the form of image data, the CPU recognizes character information from the image data. Once the CPU determines the levels of agreement between bibliographic information in the application document and the corresponding bibliographic information in the individual attached documents, the CPU reports the bibliographic information in the application document, the corresponding bibliographic information in the attached documents, and the levels of agreement between these bibliographic information.

8 Claims, 12 Drawing Sheets

(51) Int. Cl.
*G06F 40/194* (2020.01)
*G06K 9/32* (2006.01)

(52) U.S. Cl.
CPC ............... *G06K 9/325* (2013.01); *G06T 7/11* (2017.01); *G06T 2207/30176* (2013.01)

(56) References Cited

U.S. PATENT DOCUMENTS

| | | | |
|---|---|---|---|
| 2008/0235579 A1* | 9/2008 | Champion | G06F 40/194 715/273 |
| 2011/0025842 A1* | 2/2011 | King | H04N 1/0036 348/135 |
| 2012/0177291 A1* | 7/2012 | Gronau | G06K 9/00402 382/190 |
| 2013/0170749 A1* | 7/2013 | Tian | G06K 9/00456 382/171 |
| 2015/0063714 A1* | 3/2015 | King | G06F 40/169 382/229 |
| 2017/0124347 A1* | 5/2017 | Kamata | G06F 16/93 |
| 2017/0249507 A1* | 8/2017 | King | G06K 7/1404 |
| 2017/0286767 A1* | 10/2017 | Panferov | G06K 9/00483 |
| 2018/0096203 A1* | 4/2018 | King | G06F 40/166 |
| 2019/0019022 A1* | 1/2019 | Marda | G06K 9/00483 |
| 2019/0317983 A1* | 10/2019 | Dai | G06F 40/197 |
| 2020/0193153 A1* | 6/2020 | Lee | G06F 40/226 |
| 2020/0250805 A1* | 8/2020 | Tsukamoto | G06T 7/0002 |
| 2020/0320291 A1* | 10/2020 | Sanjar | G06K 9/6262 |
| 2020/0342005 A1* | 10/2020 | Kreutzer | G06F 16/2255 |
| 2020/0410232 A1* | 12/2020 | Ono | G06K 9/00483 |

FOREIGN PATENT DOCUMENTS

| | | |
|---|---|---|
| JP | 2000-076357 A | 3/2000 |
| JP | 2002-269095 A | 9/2002 |
| JP | 2004-094520 A | 3/2004 |
| JP | 2008-059157 A | 3/2008 |
| JP | 2008059157 A * | 3/2008 |
| JP | 2010-237909 A | 10/2010 |
| JP | 2017-167804 A | 9/2017 |

OTHER PUBLICATIONS

Decision to Grant Patent dated Aug. 20, 2019, as received in Japanese application No. 2019-119078.
European Search Report in Application No. 20182233.5 dated Nov. 4, 2020.

* cited by examiner

| 臨床研究課題 | AB123のOOOを対象とした臨床研究 | | | | |
|---|---|---|---|---|---|
| 研究の予定期間 | 西暦 2019 年 2 月 1 日 ～ 西暦 2021 年 1 月 31 日 | | | | |

添付資料一覧

| | 資料名 | 作成年月日 | 版表示 |
|---|---|---|---|
| ■ | 実施計画（省令様式第1）*1 | 2018 年 12 月 1 日 | 1.0 |
| ■ | 研究計画書 | 2018 年 12 月 1 日 | 1.0 |
| □ | 説明文書（補償の概要含む）、同意文書 ※研究計画書添付資料の場合 | 年 月 日 | |
| ■ | 研究分担者リスト | 2018 年 10 月 1 日 | 1.0 |
| ■ | 疾病等が発生した場合の対応に関する手順書 | 2018 年 10 月 10 日 | 3.0 |
| ■ | モニタリングに関する手順書 | | |

FIG. 11

| OCR status | Noise | | Distortion | | Keystone effect | |
|---|---|---|---|---|---|---|
| Character string status | Result | Feedback | Result | Feedback | Result | Feedback |
| Precursory process: OK | ○ | × | ○ | × | ○ | × |
| Precursory process: Warning | ● | ○ | ● | ○ | ● | ○ |
| Precursory process: Alert | ● | ○ | ● | ○ | ● | ○ |
| Precursory process: Error | ○ | ○ | ○ | ○ | ○ | ○ |
| Precursory process: Not subject to processing | ○ | ○ | ○ | ○ | ○ | ○ |
| Postliminary process: OK | ○ | × | ○ | × | ○ | × |
| Postliminary process: Warning | ○ | ○ | ○ | ○ | ○ | ○ |
| Postliminary process: Alert | ○ | ○ | ○ | ○ | ○ | ○ |
| Postliminary process: Error | ○ | ○ | ○ | ○ | ○ | ○ |

○ : Output
× : No output
● : Output; used for OCR training

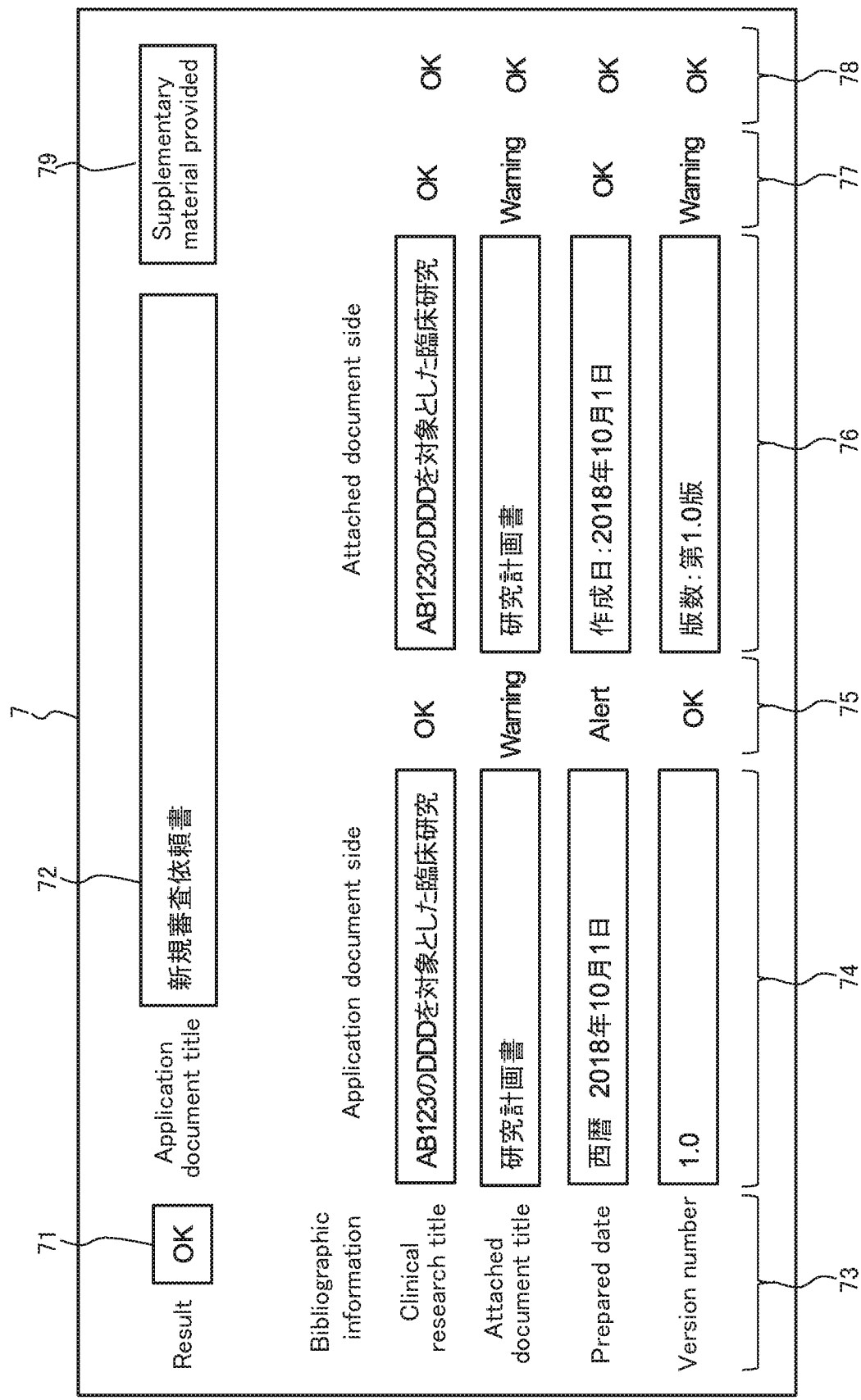

DOCUMENTATION DETERMINATION DEVICE AND DOCUMENTATION DETERMINATION PROGRAM

CROSS-REFERENCE TO RELATED APPLICATIONS

This application is based upon and claims the benefit of priority from Japanese Patent Application No. 2019-119078 filed Jun. 26, 2019, the entire contents of which are incorporated herein by reference.

TECHNICAL FIELD

The disclosure relates to documentation determination device and documentation determination program.

BACKGROUND ART

The widespread availability of communication infrastructure and advancement of information technology (IT) of recent years have led to paperwork becoming increasingly digitized, enabling the easing of workload. For example, the applicant provides a cloud service for hospitals and pharmaceutical companies to help reduce paperwork associated with research and development of drugs (such as clinical research and clinical trials). Paperwork associated with drug research and development include the handling of semi-structured documents used in routine procedures, for example checking their contents and printing hard copies as well as posting, filing, and storing (for twenty to thirty years) these documents. By digitizing, not only can printing hard copies be cut down, but the labor involved in sending documents by post, filing, and storing document hard copies can be saved.

Through the provision of a cloud service, the applicant has learnt that the version number or the date of an attached document provided in an application document often does not agree with the version number or the date provided in the actual attached document. In some cases, inconsistencies are found in both the version number and the date. Version numbers and dates represent bibliographic elements that make up bibliographic information. Thus, bibliographic information of attached documents provided in an application document often lack agreement with bibliographic information given in the corresponding attached documents.

Patent Literature 1 (Japanese Unexamined Patent Application Publication No. 2000-076357) provides a teaching of prior art concerning the checking of bibliographic information. The abstract provided in Patent Literature 1 teaches the following: "During the distribution of a design document, the design information monitor 5 compares the version number of design data stored in the reference record database 3 with the version number of the design data that the design document being distributed referred to from the design database 2. If the version numbers are different, the distribution of the design document is suspended and the designer who placed the design document in the workflow is notified of the lack of consistency between the design document and the design data stored in the design database 2."

SUMMARY

However, although the invention of Patent Literature 1 is effective when both the application document and attached documents are in the form of text data, the same cannot be said when the application document or any of the attached documents or both the application document and any of the attached documents are in the form of image data. This is because a recognition error of optical character recognition (OCR) software that is used to extract text from image data can result in a false detection of inconsistency in bibliographic information when in fact correct information is provided in the application document and attached documents.

It is the object, therefore, to determine whether bibliographic information given in an application document and attached documents are in agreement when either the application document or any of the attached documents or both are in the form of image data.

In one embodiment, the documentation determination device includes a recognition unit and a control unit. An application document and attached documents are input data to the documentation determination device, wherein in the application document, a list of the attached documents is provided, and each listed item in the list of the attached documents includes first bibliographic information of an attached document. When the application document, one or more of the attached documents linked to the application document, or both the application document and one or more of the attached documents linked to the application document are image data, the recognition unit is configured to recognize character information from the image data, wherein the control unit is configured to (i) acquire the first bibliographic information for each listed item in the application document; (ii) acquire second bibliographic information of an attached document given in each of the attached documents; (iii) determine a level of agreement between the second bibliographic information of each of the attached documents and the first bibliographic information of a corresponding listed item in the list of attached documents; and (iv) report, for each of the attached documents, (a) the second bibliographic information, (b) the first bibliographic information of the corresponding listed item, and (c) the level of agreement between the second bibliographic information and the first bibliographic information of the corresponding listed item. When a second character string of the second bibliographic information of one of the attached documents and a first character string of the first bibliographic information of a corresponding listed item in the list of attached documents do not match, the control unit is configured to (i) generate a pair of images through rendering, one image rendered from at least one non-matching character in the first character string and another image rendered from at least one non-matching character in the second character string; and (ii) compare the pair of images to determine a level of agreement between the pair of images.

In another embodiment, the documentation determination device again includes a recognition unit and a control unit. An application document and attached documents are input data to the documentation determination device, wherein in the application document, a list of the attached documents is provided, and each listed item in the list of the attached documents includes first bibliographic information of an attached document. When the application document and the attached documents linked to the application document are image data, the recognition unit is configured to recognize character information from the image data, wherein the control unit is configured to (i) acquire the first bibliographic information for each listed item in the application document; (ii) acquire second bibliographic information of an attached document given in each of the attached documents; (iii)

determine a level of agreement between the second bibliographic information of each of the attached documents and the first bibliographic information of a corresponding listed item in the list of attached documents; and (iv) report, for each of the attached documents, (a) the second bibliographic information, (b) the first bibliographic information of the corresponding listed item, and (c) the level of agreement between the second bibliographic information and the first bibliographic information of the corresponding listed item. In this embodiment, when a second character string of the second bibliographic information of one of the attached documents and a first character string of the first bibliographic information of a corresponding listed item in the list of attached documents do not match, the control unit is configured to (i) generate one cut out from one of the image data corresponding to at least one non-matching character in the first character string; (ii) generate another cut out from another one of the image data at least one non-matching character in the second character string; and (iii) compare the two cut outs and determine a level of agreement between the two cut outs.

In another embodiment, a documentation determination program wherein when an input application document, one or more of input attached documents linked to the application document, or both the application document and one or more of the attached documents linked to the application document are image data, wherein a list of the attached documents is provided in the application document and each listed item in the list of the attached documents includes first bibliographic information of an attached document, the documentation determination program enables a computer to perform the acts of: (i) recognizing character information from the image data; (ii) acquiring the first bibliographic information for each listed item in the application document; (iii) acquiring second bibliographic information of an attached document given in each of the attached documents; (iv) determining a level of agreement between the second bibliographic information of each of the attached documents and the first bibliographic information of a corresponding listed item in the list of attached documents; (v) reporting, for each of the attached documents, (a) the second bibliographic information, (b) the first bibliographic information of the corresponding listed item, and (c) the level of agreement between the second bibliographic information and the first bibliographic information of the corresponding listed item. Furthermore, when a second character string of the second bibliographic information of one of the attached documents and a first character string of the first bibliographic information of a corresponding listed item in the list of attached documents do not match, the documentation determination program enables a computer to perform the acts of: (i) generating a pair of images through rendering, one image rendered from at least one non-matching character in the first character string and another image rendered from at least one non-matching character in the second character string, and (ii) comparing the pair of images to determine a level of agreement between the pair of images.

According to the documentation determination device and documentation determination program of the disclosure, it is possible to determine whether bibliographic information given in an application document and attached documents are in agreement when either the application document or any of the attached documents or both the application document and any of the attached documents are in the form of image data.

BRIEF DESCRIPTION OF THE DRAWINGS

The disclosure will become more fully understood from the following detailed description, taken in conjunction with the accompanying figures, in which:

FIG. 3 illustrates an example of an application document.

FIG. 11 illustrates the relationship between misrecognition status and output contents.

FIG. 12 illustrates an example of a result form displayed on-screen.

DESCRIPTION

Details of embodiments of the present disclosure will be given with reference to figures.

Figure 1:
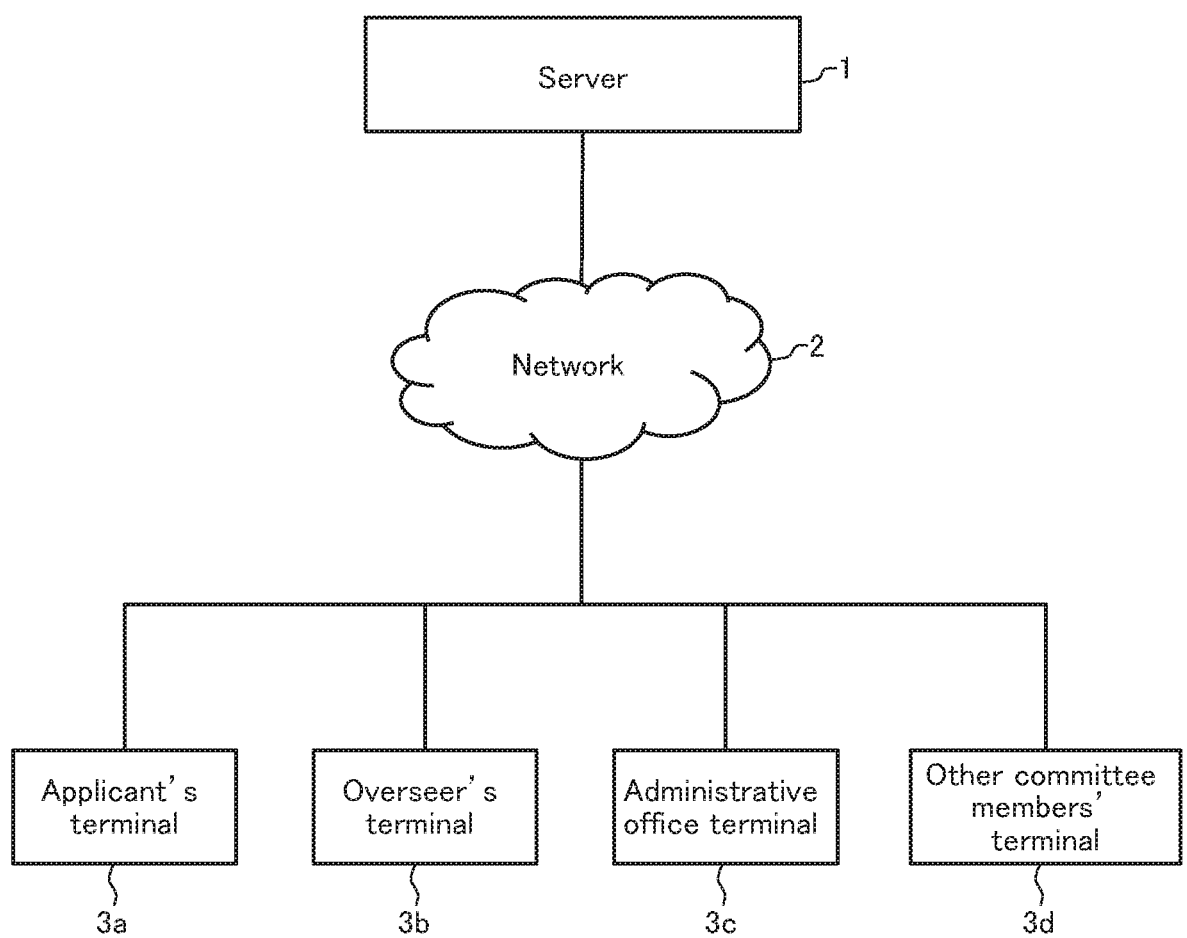
FIG. 1 illustrates a document management cloud system according to an embodiment of the present disclosure.

FIG. 1 illustrates a document management cloud system of the present embodiment.

The document management cloud system is configured from a server 1, an applicant's terminal 3a, an overseer's terminal 3b, an administrative office terminal 3c, and other committee members' terminal 3d that are communicably connected to a network 2. The purpose of this document management cloud system is to digitize paperwork concerning research and development of drugs.

An application workflow begins with an applicant providing an application document and attached documents as input data using the applicant's terminal 3a. This application workflow is then routed to an overseer of the application. Once the overseer approves the workflow on the overseer's terminal 3b, the workflow is routed to the administrative office.

In this way, the document management cloud system digitizes paperwork concerning drug research and development that have conventionally been carried out using document hard copies that are affixed with a seal and mailed by post.

Figure 2:
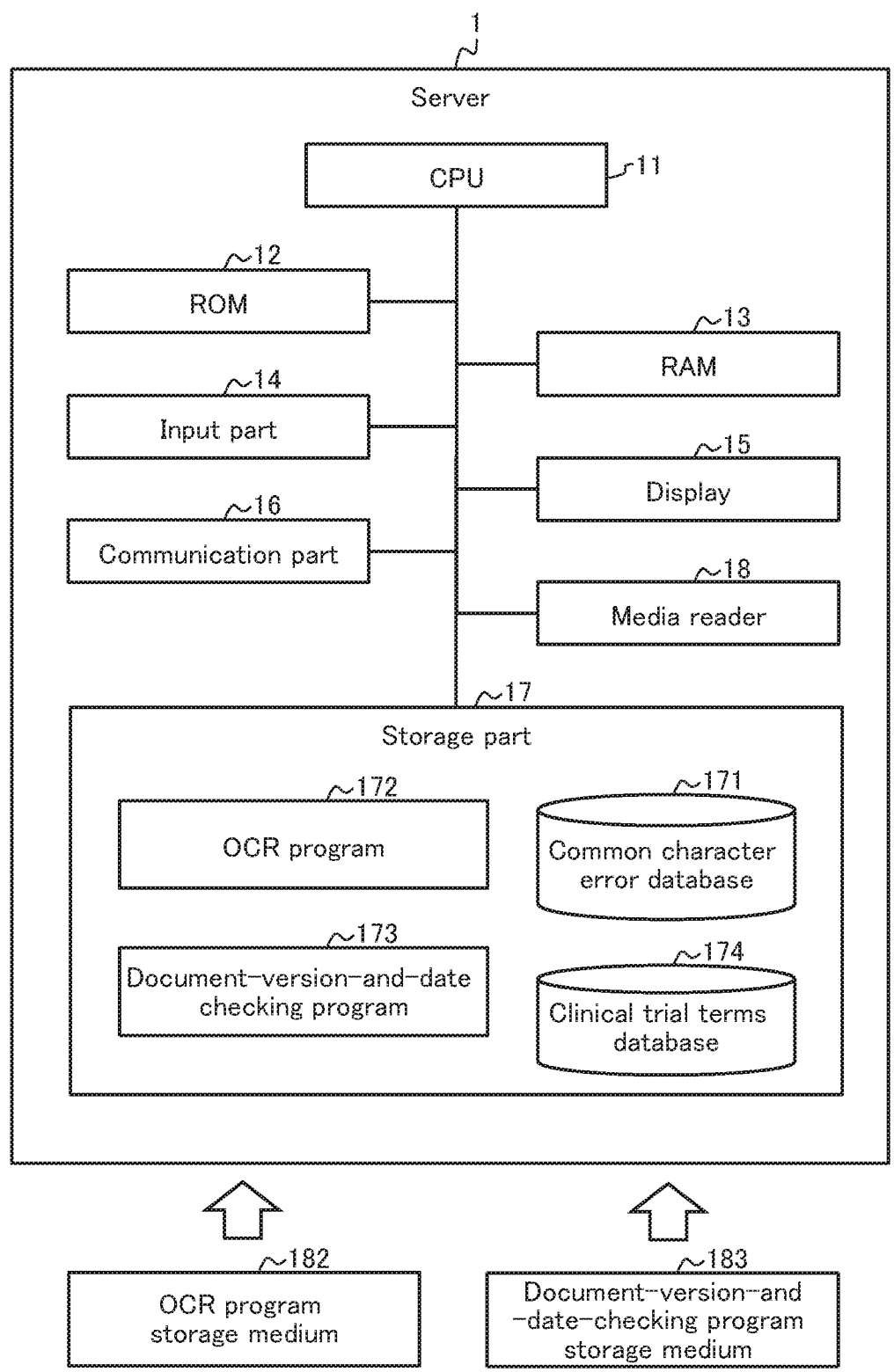
FIG. 2 illustrates a block diagram of a document management cloud server according to an embodiment of the present disclosure.

FIG. 2 is a block diagram of a server 1 according to the document management cloud system of the present embodiment.

The server 1 is a computer and includes a CPU (central processing unit) 11, ROM (read only memory) 12, and RAM (random access memory) 13. The CPU 11, ROM 12, and RAM 13 form a control unit that integrally controls the server 1.

The server 1 further includes an input part 14 such as a mouse and a keyboard, a display 15, a communication part 16 such as a network interface, a storage part 17, and a media reader 18. The communication part 16 functions as an acquisition part for acquiring information from outside the server 1. The storage part 17 stores a common character error database 171, a clinical trial terms database 174, an OCR program 172, and a document-version-and-date checking program 173. The media reader 18 reads from, for example, an OCR program storage medium 182 or the document-version-and-date-checking program storage medium 183. In this way, the server 1 is installed with the OCR program 172 and document-version-and-date checking program 173 so that the server 1 functions as a documentation determination device.

By executing the document-version-and-date checking program 173, the CPU 11 determines whether bibliographic information provided on an application document concerning attached documents and bibliographic information on the attached documents are in agreement.

Using image data as input, the OCR program 172 enables the CPU 11 to execute a procedure for recognizing characters included in image data and converting them into text. Through the execution of the OCR program 172 by the CPU 11, a recognition unit that recognizes characters included in image data is realized. Through the execution of the OCR program 172 by the CPU 11, a convolutional neural network is realized that learns a correspondence between a character image and a character and outputs a string of characters read from image data. The convolutional neural network is able to improve the accuracy of character recognition through deep learning in which an image of a misrecognized character and its relationship with a correct character corresponding to the image are fed into training data so that relearning can take place.

The common character error database 171 is where an original character that is frequently misrecognized (a correct character) and a corresponding character resulting from misrecognition (erroneous character) are stored. To give a few examples, "l" (a pipe symbol), "○" (a circle symbol), and "曰" (a Chinese character for "to say") are erroneous characters resulting from misrecognition, where the original characters are "1" (an Arabic numeral representing one), "0" (an Arabic numeral representing zero), and "日" (a Chinese character for "day") respectively.

The clinical trial terms database 174 stores terms that are specific to clinical trials and stores, for example, names of drugs.

FIG. 3 shows an example of an application document 4.

The application document 4 shown in FIG. 3 is a New Request for Review document for requesting a review for new clinical research, and may, for example, be in the form of a PDF (portable document format) file of scanned image data. The application document title 41 appears at the top of the page as "新規審査依頼書" ("New Request for Review"). Below this appears a clinical research title 42 given as "A B １２３ の D D D を対象とした臨床研究" ("Clinical Research Targeting XXX of AB123"). The character string on the left of the clinical research title 42 is the description "臨床研究課題" 50 ("clinical research title"). Other descriptions that appear in the application document 4 of FIG. 3 are the following: (a) the name of the clinical research review board 47 to which the application document is addressed; (b) the name of the principal investigator 48; (c) a short statement requesting the review of the clinical research 49; and (d) a field for entering the intended research period 51.

Further below is a table of attached documents titled "添付資料 一覧" 43 ("Attached Document List").

The three column headers of the table from the left are "資料名" 44 ("Attached Document Title"), "作成年月日" 45 ("Prepared Date"), and "版表示" 46 ("Version Number").

For the first listed attached document, an attached document title 431 is given as "実施計画 (省令様式第1)" ("Implementation Plan [Format 1 as specified by Ministerial ordinance]"). On the right, a prepared date 441 of the attached document is given as "２０１８年１２月１日" ("Dec. 1, 2018") and a version number 451 of the attached document is given as "1.0".

For the second listed attached document, an attached document title 432 is given as "研究計画書" ("Research Plan"). On the right, a prepared date 442 of the attached document "２０１８年１２月１日" ("Dec. 1, 2018") and a version number 452 of the attached document "1.0" are given.

For the third listed attached document, an attached document title 433 is given as "研究分担者リスト" ("List of Investigators"). On the right, a prepared date 443 of the attached document is given as "２０１８年１０月１日" ("Oct. 1, 2018") and a version number 453 of the attached document is given as "1.0".

For the fourth listed attached document, an attached document title 434 is given as "疾病等が発生した場合の対応に関する手順書" ("Procedure in the Event of an Illness or the Like"). On the right, a prepared date 444 of the attached document is given as "２０１８年１０月１０日" ("Oct. 10, 2018") and a version number 454 of the attached document is given as "3.0".

Figure 4:
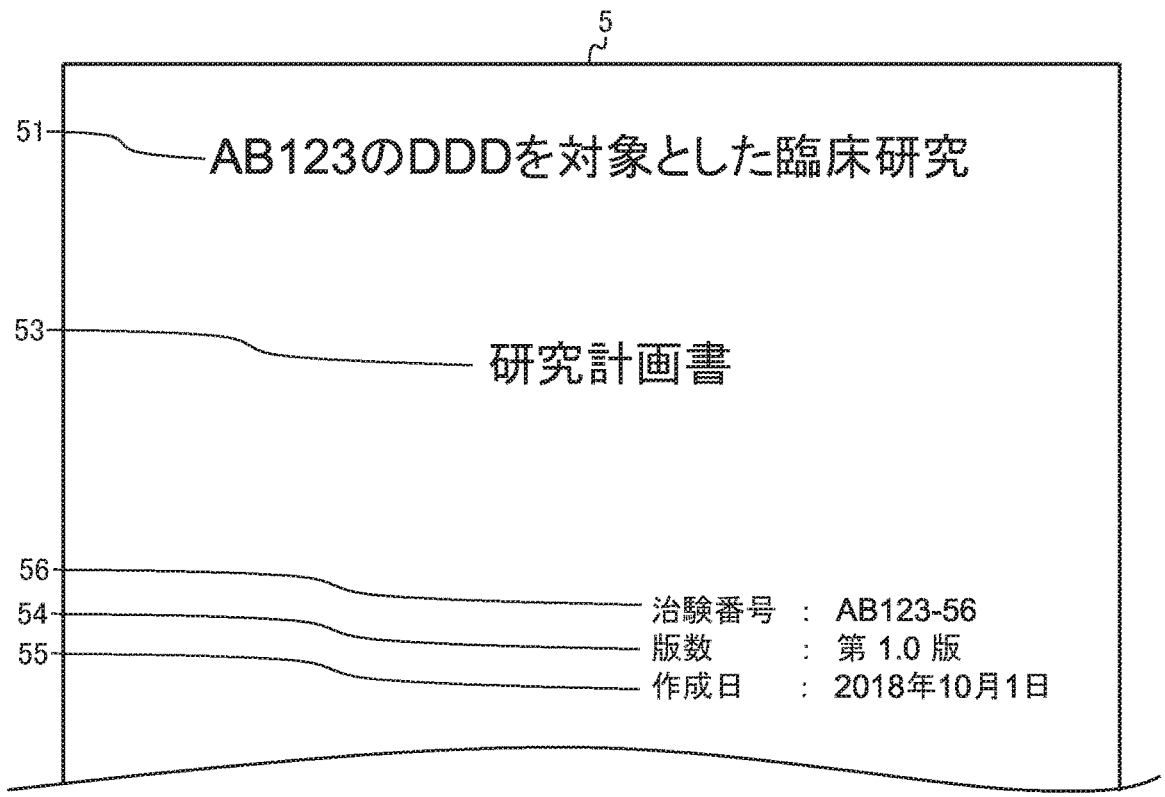
FIG. 4 illustrates an example of a cover page of a research plan document.

FIG. 4 shows an example of a cover page of a Research Plan document.

The Research Plan document of FIG. 4 is one of the attached documents linked to the application document 4 of FIG. 3. On the cover page of this attached document 5, the following information is provided: a clinical research title 51, an attached document title 53, a clinical trial ID 56, the attached document's version number 54, the attached document's prepared date 55.

The clinical research title 51 is given as, "A B １２３の D D D を対象とした臨床研究" ("Clinical Research Targeting DDD of AB123"). This clinical research title 51 given in the attached document 5 should be in agreement with the clinical research title 42 given in the application document 4.

Below, the attached document title 53 is given as "研究計画書" ("Research Plan"). This attached document title 53 given in the attached document 5 should be in agreement with one of the attached document titles listed in the application document 4. On the bottom right of the cover page, the clinical trial ID 56, version number 54, and prepared date 55 are given. The version number 54 is given as "版数: 第1．0版" ("Version: No. 1.0"). The version number 54 given in the attached document 5 should be in agreement with the version number 452 provided in the application document 4.

The prepared date 55 is given as "作成日：２０１８年１０月１日" ("Dated: Oct. 1, 2018"). This prepared date 55 given on the attached document 5 should be in agreement with the prepared date 442 provided in the application document 4.

Figure 5:
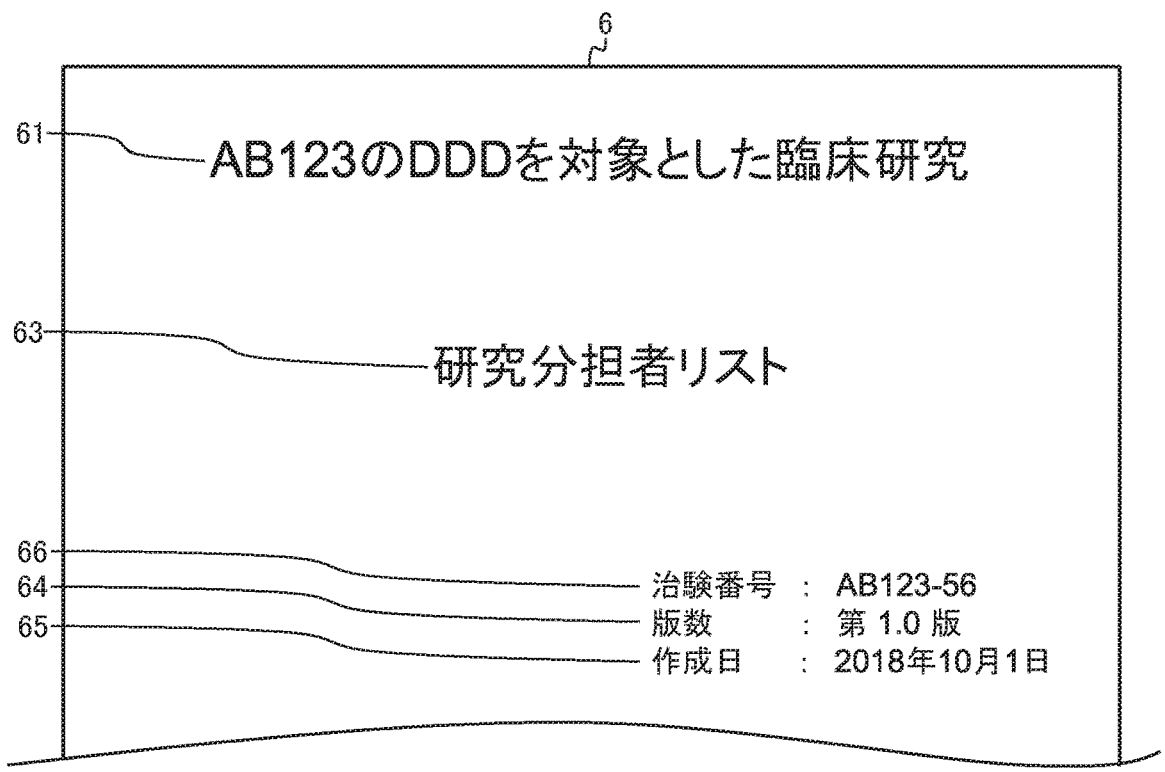
FIG. 5 illustrates an example of a cover page of a list of investigators document.

FIG. 5 shows an example of a cover page of a List of Investigators document.

The List of Investigators document of FIG. 5 is another one of the attached documents linked to the application document 4. On the cover page of this attached document 6, the following information is provided: a clinical research title 61, an attached document title 63, a clinical trial ID 66, the attached document's version number 64, and the attached document's prepared date 65.

The clinical research title 61 is given as "ＡＢ１２３のＤＤ Ｄを対象とした臨床研究" ("Clinical Research targeting DDD of AB123"). This clinical research title 61 given in the attached document 6 should be in agreement with the clinical research title 42 given in the application document 4.

Below, the name of the attached document title 63 is given as "研究分担者 リスト" ("List of Investigators"). This attached document title 63 given on the attached document 6 should be in agreement with one of the attached document titles listed in the application document 4. On the bottom right of the cover page, the clinical trial ID 66, version number 64, and prepared date 65 are given. The version number 64 is given as "版数：第１．０版" ("Version: No. 1.0"). The version number 64 given in the attached document 6 should be in agreement with the version number 453 provided in the application document 4.

The prepared date 65 is given as "作成日：２０１８年１０月１日" ("Dated: Oct. 1, 2018"). This prepared date 65 given in the attached document 6 should be in agreement with the prepared date 443 provided in the application document 4.

Figure 6A:
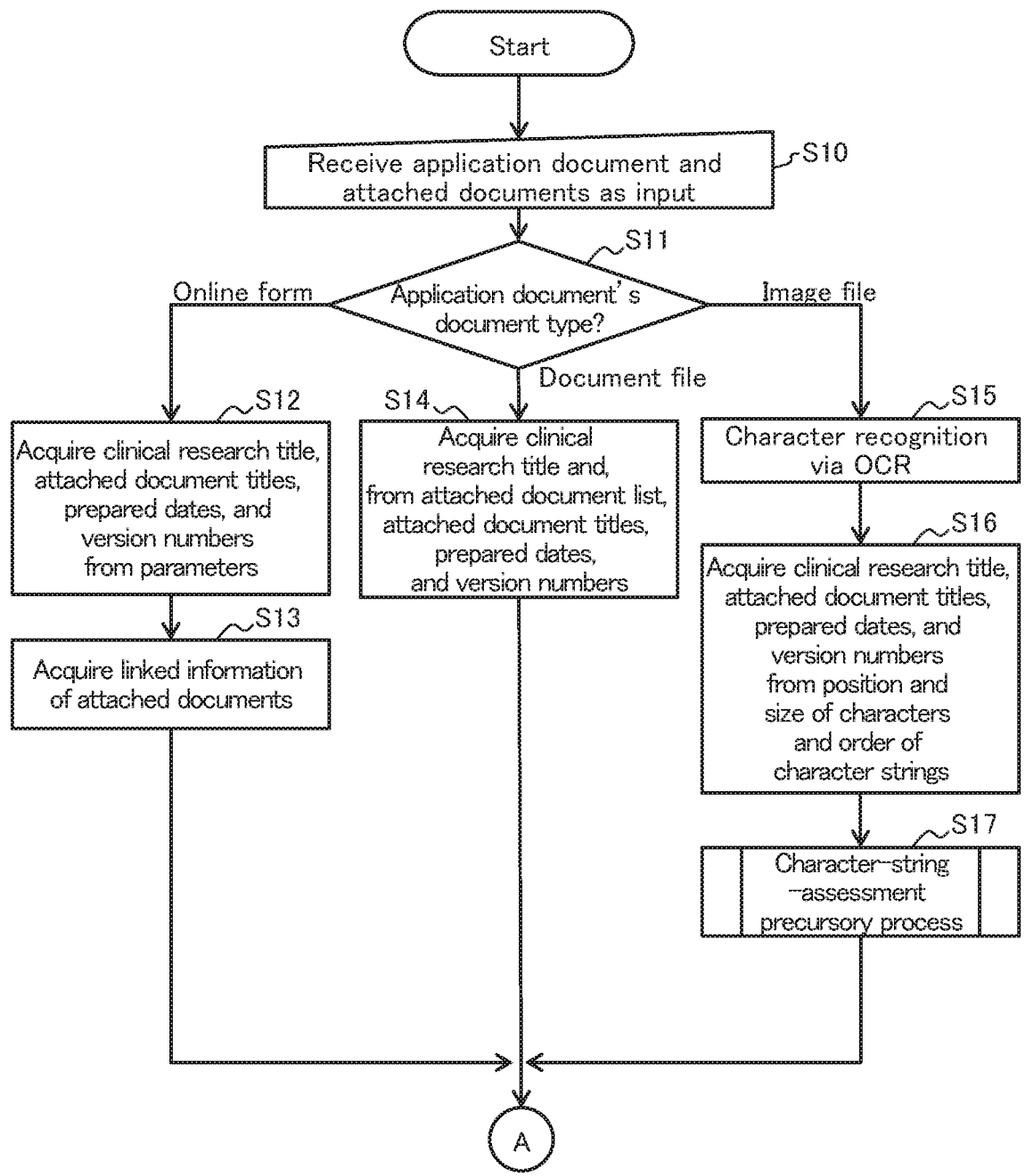
FIG. 6A is a first of the two flowcharts that illustrate processing of an application document and one or more attached documents that are input.
Figure 6B:
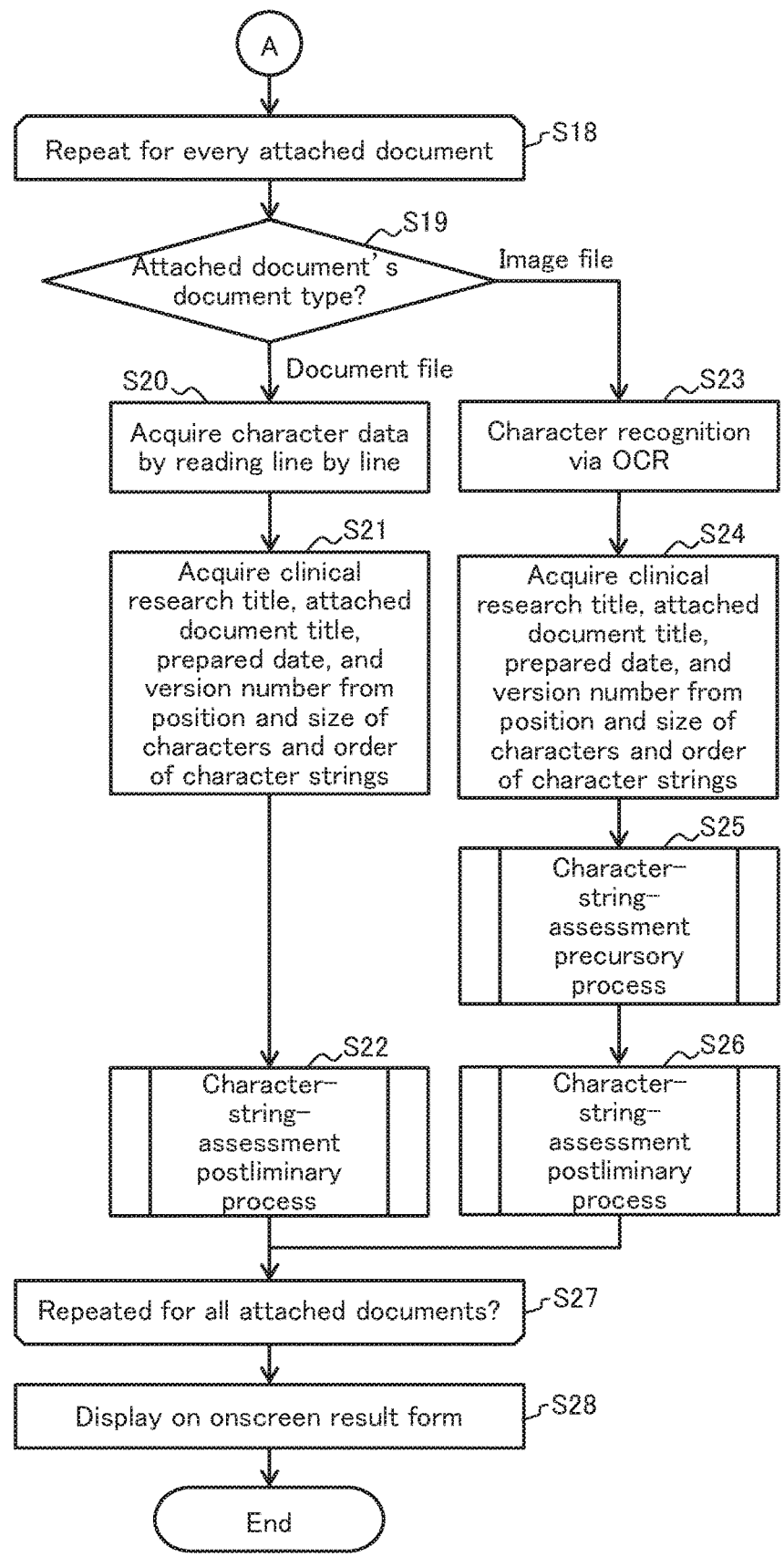
FIG. 6B is a second of the two flowcharts that illustrate processing of an application document and one or more attached documents that are input.

FIGS. 6A and 6B are flowcharts illustrating the processing of an application document and one or more attached documents that are input.

The process of FIG. 6A begins when the CPU 11 executes the document-version-and-date checking program 173.

At the start of the process, the CPU 11 receives as input an application document and one or more attached documents tied to the application document through communicating with the applicant's terminal 3a via the communication part 16 (step S10). The CPU 11 then determines what type of document the application document is (step S11) in order to advance to the next appropriate step.

From step 11, the CPU 11 advances to (i) the step S12 process if the application document is an online form, (ii) the step S14 process if the application document is a document file, and (iii) the step S15 process if the application document is an image file. An image file is, for example, a PDF file obtained by optically scanning a paper document. An image file may also be, but is not limited to, multi-page images.

In step S12, the CPU 11 acquires a clinical research title and, for every attached document that is listed, an attached document title, a prepared date, and a version number from the online form's variables. The CPU 11 then acquires information of each attached document from a link that has been entered in the online form (step S13), and advances to the process of step S18 of FIG. 6B.

In step S14, the CPU 11 acquires from the document file a clinical research title and, for every item in a list of attached documents, an attached document title, a prepared date, and a version number. The CPU 11 then advances to the process of step S18 of FIG. 6B.

In step S15, the CPU 11 recognizes characters that appear in an image of an image file via the OCR program 172 that realizes the recognition unit. From the location and size of characters and the order in which character strings appear, the CPU 11 acquires a clinical research title and, for every attached document that is listed, an attached document title, a prepared date, and a version number (step S16).

More specifically, a string of characters located in the upper part of the application document that follows the character string "臨床研究課題" 50 ("Clinical Research Title") is acquired as a character string indicating the clinical research title.

A character string that is located in a table titled "添付資料一覧" 43 ("Attached Document List") and that appears under the column header "資料名" 44 ("Attached Document Title") is acquired as a character string indicating an attached document title. Note that when a checkbox on the left of the character string indicating an attached document title is unmarked, the CPU 11 assumes that the document connected to the row does not exist.

A character string that is located in the table titled "添付資料一覧" 43 ("Attached Document List") and that appears under the column header "作成年月日" 45 ("Prepared Date") is acquired as a character string indicating a prepared date.

A character string that is located in the table titled "添付資料一覧" 43 ("Attached Document List") and that appears under the column header "版表示" 46 ("Version Number") is acquired as a character string indicating a version number.

The CPU 11 then carries out a character-string-assessment precursory process (step S17), then advances to step S18 of FIG. 6B. The character-string-assessment precursory process corrects common erroneous characters and assesses the OCR result of character strings. Details of this process is given later with reference to FIGS. 7A and 7B.

Steps from S18 to S27 make up a loop process that is repeated for each attached document. Within this loop process, the CPU 11 determines what type of document an attached document is (step S19) in order to advance to the next appropriate step.

If, in step S19, the attached document is determined to be a document file, the CPU 11 advances to step 20. If, on the other hand, the attached document is determined to be an image file, the CPU 11 advances to step 23.

In step S20, the CPU 11 acquires character data by reading the document file line by line. From the location and size of characters and the order in which character strings appear, the CPU 11 acquires a clinical research title, an attached document title, prepared date, and a version number (step S21). More specifically, the CPU 11 acquires as the clinical research title, the first character string that is given with the largest or second largest font size on the cover page of the document file. The CPU 11 acquires as the attached document title, the second character string that is given with the largest or second largest font size. The CPU 11 acquires as the prepared date, a character string that is located below the attached document title and that includes "作成日" ("Prepared Date") or "作成年月日" ("Prepared Date [Year, Month, Day]"). The CPU 11 acquires as the version number, a character string that is located below the attached document title and that includes "版数" ("Version Number"), "版番号" ("Version Number"), "版表示" ("Version Statement"), or "Version".

Next, the CPU 11 carries out a character-string-assessment postliminary process (step S22), in which the clinical research title, attached document title, prepared date, and version number provided in the attached document are compared with the attached document title, prepared date, and version number for the attached document that is provided in the application document. Once the process of step S22 is completed, the CPU 11 advances to the process of step S27.

The character-string-assessment postliminary process S22 is a process for determining the level of agreement between (i) bibliographic information that is provided in an application document for each attached document and (ii) bibliographic information that is given on the cover page of each attached document. A detailed description is given later with reference to FIGS. 8A and 8B.

In step S23, the CPU 11 reads the image file with the OCR program 172 and recognizes the characters that appear in the image of the image file. Note that through the execution of the OCR program 172 by the CPU 11, the recognition unit of the documentation determination device that recognizes characters included in image data is realized. Based on the location and size of characters and the order in which character strings appear, the CPU 11 acquires a clinical research title, an attached document title, a prepared date, and a version number (step S24). Next, the CPU 11 carries out the character-string-assessment precursory process (step S25), and following that, carries out the character-string-assessment postliminary process (step S26), and then advances to step S27. The character-string-assessment postliminary process of step S26 is the same as the character-string-assessment postliminary process of step S22.

In step S27, the CPU 11 determines whether all attached documents have been processed. If there are any attached documents that have been left unprocessed, the CPU 11 returns to step S18. If the process has been repeated for all attached documents, the CPU 11 advances to step S28.

In step S28, the CPU 11 displays the determined result of a level of agreement between the application document and each attached document on an on-screen result form 7 of FIG. 12 (detailed description to follow). The CPU 11 then completes the process of FIG. 6B.

Figure 7A:
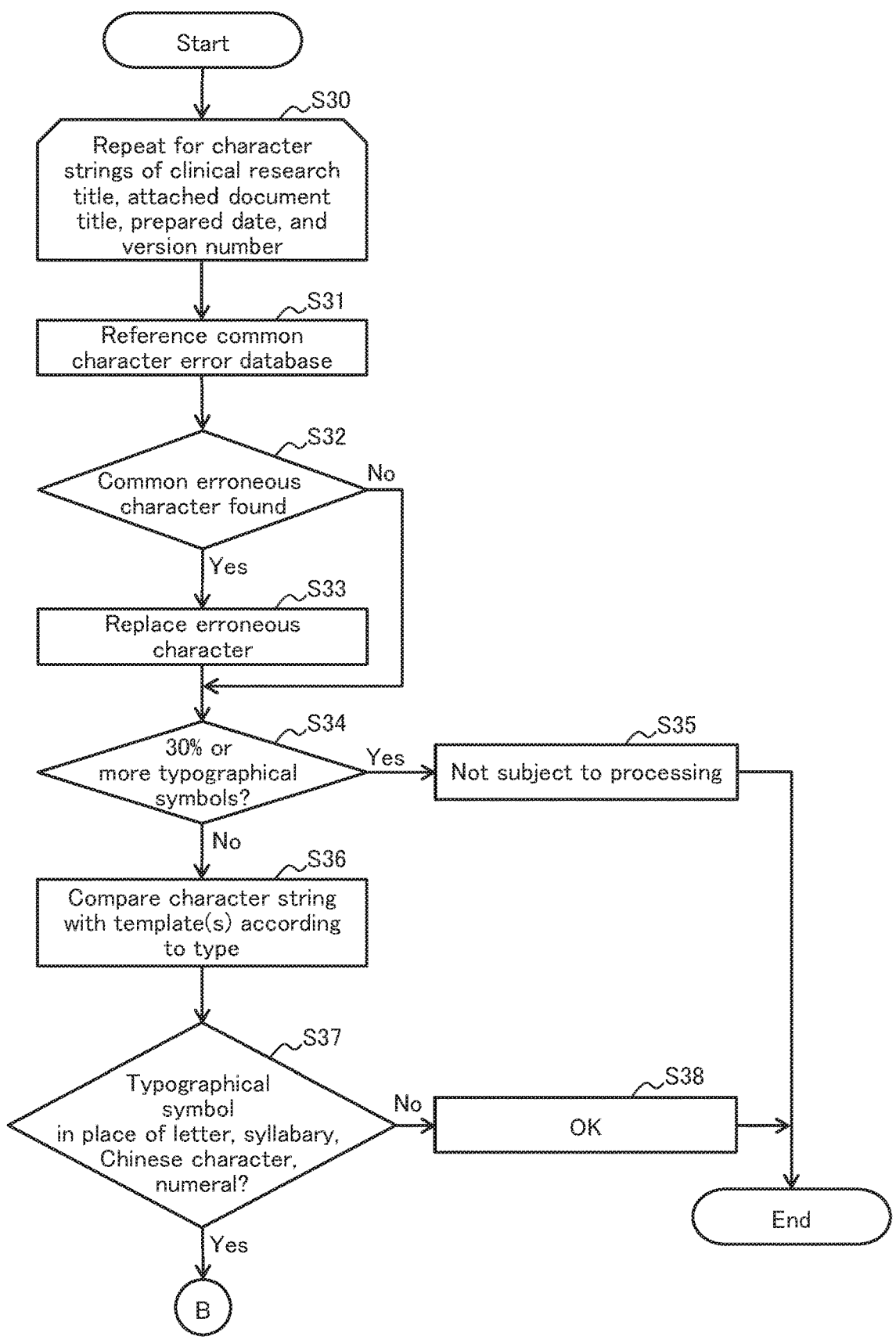
FIG. 7A is a first of the two flowcharts illustrating a character-string-assessment precursory process.
Figure 7B:
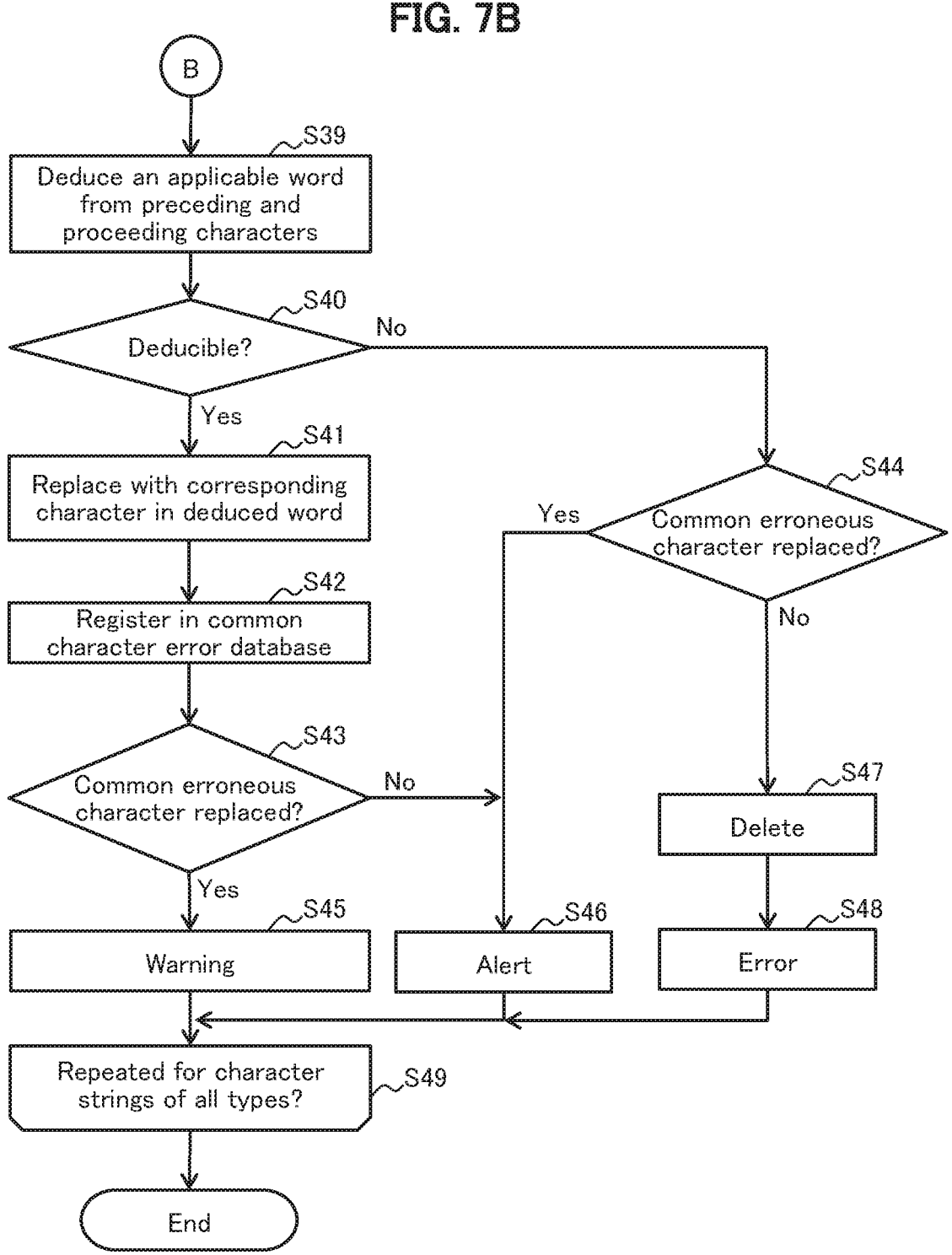
FIG. 7B is a second of the two flowcharts illustrating a character-string-assessment precursory process.

FIGS. 7A and 7B are flowcharts illustrating the character-string-assessment precursory process. This process is called after individual character strings have been recognized from image data using the OCR program 172.

The process described by steps S30 to S49 is repeated by the CPU 11 for each of the character strings that have been recognized by OCR, namely character strings of the following types: a clinical research title, an attached document title, a prepared date, and a version number.

First, the CPU 11 references the common character error database 171 (step S31) so that the CPU 11 can determine in step S32 whether there is a common erroneous character in a character string that is currently being processed (a "current character string"). If a common erroneous character is found ("Yes") in the current character string, that common erroneous character is replaced with a correct character (step S33), and the CPU 11 advances to step S34. If no common erroneous character is found in the current character string ("No"), the CPU 11 advances to step S34.

Common erroneous characters are characters that are similar in appearance to characters used in descriptions of bibliographic information, but do not actually get used in these descriptions. Examples of common erroneous characters include "|" (a pipe symbol), "○" (a circle symbol), and "曰" (a Chinese character for "to say"). The symbol "|" is an erroneously recognized character of "1" (an Arabic numeral representing one), the symbol "○" of "0" (an Arabic numeral representing zero), and the Chinese character "曰" of "日" (a Chinese character for "day").

In step S34, the CPU 11 determines whether 30% or more of the current character string is made up of typographical symbols. If typographical symbols make up 30% or more of the character string ("Yes"), the CPU 11 determines that the character string is not subject to processing (step S35), and ends the process of FIG. 7A.

Note that although in the above description, the CPU 11 determines whether 30% or more of the character string is made up of typographical symbols, other threshold values may be used, such as 10%.

Furthermore, the CPU 11 compares the character string with one or more templates according to the type thereof (step S36). To be more specific, template examples of the prepared date include "西暦 n n n n 年 n n 月 n n 日" ("Year in the Christian Era nnnn, Month nn, Day nn"), "令和 n 年 n n 月 n n 日" ("Year in Japan's Reiwa Era n, Month nn, Day nn"), and "nnnn/nn/nn", where 'n' is a numeral. Template examples of the version number include "第 n. n 版" ("Version n.n"), "Version. n.n", and "n.n", where 'n' is a numeral.

The CPU 11 determines whether there is a typographical symbol where another type of character such as a letter, Chinese character, syllabic character, or numeral is expected (step S37). If a typographical symbol is not found in a place where a letter, Chinese character, syllabic character, or numeral is expected ("No"), the CPU 11 determines that the character string is satisfactory ("OK") (step S38) and completes the process of FIG. 7A. If a typographical symbol is found in a place where a letter, Chinese character, a syllabic character, or a numeral is expected ("Yes"), the CPU 11 advances to step S39 of FIG. 7B.

In step S39, based on the characters preceding and proceeding the typographical symbol, the CPU 11 deduces an applicable word. More specifically, the CPU 11 may make a deduction by using the templates used in step S36 or by using a clinical trial terms database 174. For example, "西暦 2 0 1 9 年 1 0□1 日" corresponds best to the template "西暦 n n n n 年 n n 月 n n 日", and from the characters preceding and proceeding the typographical symbol "□", it is possible to deduce that "月" (a Chinese character meaning "month") is the applicable word. In another example, it is possible to deduce that the word "メトクロプラミド" ("metoclopramide") stored in the clinical trial terms database 174 is the applicable word for "メトクロブラミド" ("metoclobramide") due to the very small Levenshtein distance.

In step S40, the CPU 11 determines whether it is possible to deduce an applicable word. If the answer is yes, the CPU 11 replaces the typographical symbol with a corresponding character (a "replacing character") in the applicable term (step S41), registers the replacing character and the typographical symbol in the common character error database 171 (step S42), and advances to step S43. If, on the other hand, the answer is no (the CPU 11 determines that it is not possible to predict an applicable word), the CPU 11 advances to step S44.

In step S43, the CPU 11 determines whether a common erroneous character has been replaced in step S33. If a common erroneous character has been replaced in step S33 ("Yes"), the CPU 11 determines that the current character string has a "warning" status (step S45) and advances to step S49. If no replacing of a common erroneous character has taken place ("No"), the CPU 11 determines that the current character string has an "alert" status (step S46) and advances to step S49.

In step S44, the CPU 11 determines whether a common erroneous character has been replaced. If a common erroneous character has been replaced ("Yes"), the CPU 11 determines that the current character string has an "alert" status (step S46) and advances to step S49. If no replacing of a common erroneous character has taken place ("No"), the CPU 11 deletes the current character string (step S47), determines an "error" status (step S48) and advances to step S49.

In step S49, the CPU 11 determines whether all character strings of all types (namely a clinical research title, an attached document title, a prepared date, and a version number) have been processed. If there are any unprocessed character strings, then the CPU 11 returns to step S30. If all character strings of all types have been processed, the CPU 11 ends the process of FIG. 7B.

Through the character-string-assessment precursory process, the CPU 11 improves character recognition accuracy of OCR by using the common character error database 171. Furthermore, by using word deduction, the CPU 11 is able to correct erroneous recognition of OCR and register a new erroneous recognition pattern to the common character error database 171. The CPU 11 is able to assess the reliability of each character string that has been obtained through OCR.

Figure 8A:
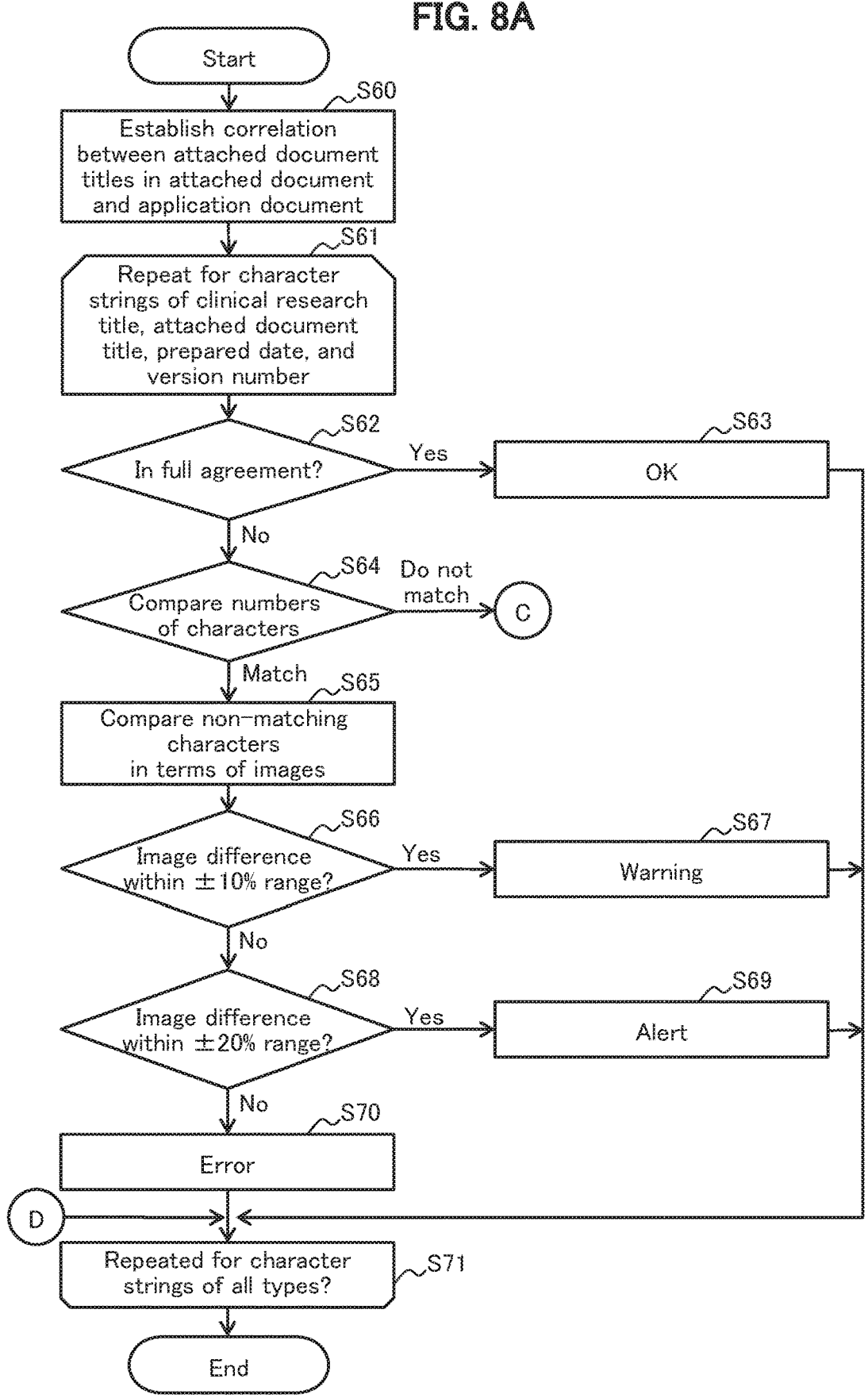
FIG. 8A is a first of the two flowcharts illustrating a character-string-assessment postliminary process.
Figure 8B:
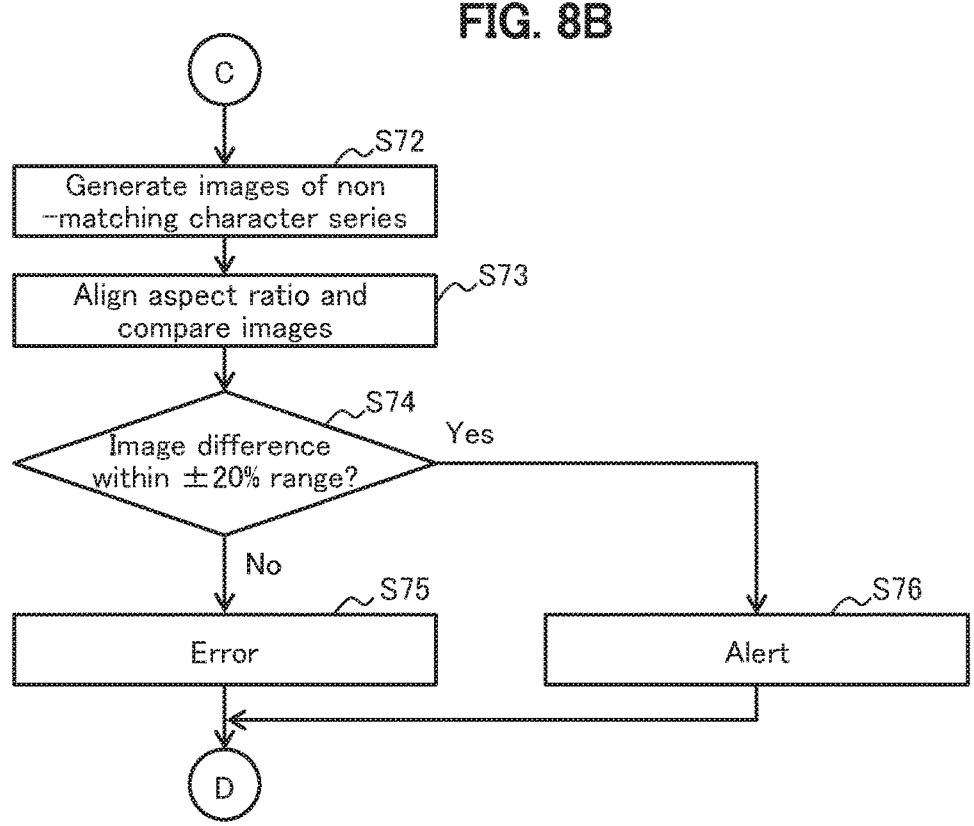
FIG. 8B is a second of the two flowcharts illustrating a character-string-assessment postliminary process.

FIGS. 8A and 8B are flowcharts illustrating the character-string-assessment postliminary process.

First, the CPU 11 establishes a correlation between an attached document title listed in an attached document list of an application document and an attached document title given on the cover page of an attached document (step S60). Subsequent steps are related to the attached document and an item in the attached document list of the application document that has been identified as corresponding to the attached document (an "identified item").

The process described by steps S61 to S71 is repeated by the CPU 11 for each bibliographic element, namely a clinical research title, an attached document title, a prepared date, and a version number. The bibliographic element being processed is referred to as a "current bibliographic element".

In step S62, the CPU 11 determines whether the current bibliographic element of the identified item in the application document is in full agreement with the corresponding bibliographic element given in the attached document. If the two bibliographic elements are in full agreement ("Yes"), the CPU 11 determines that the pair of bibliographic elements have an "OK" status (step S63), and advances to step S71. By "in full agreement", it means that the character strings of the two bibliographic elements match.

Note that when comparing the pair of bibliographic elements in step S62, supplementary characters within character strings may be discarded first. For example, when determining whether bibliographic elements "西暦２０１８年１０月１日" and "作成日：２０１８年１０月１日" are in agreement or not, "西暦" is discarded from "西暦２０１８年１０月１日" and "作成日" from "作成日：２０１８年１０月１日", so that comparison is made between character strings "２０１８年１０月１日" and "２０１８年１０月１日". Also, bibliographic elements formatted differently may first be aligned so as to make comparisons meaningful. For example, if one date is provided in the Christian era and the other in the Japanese era, the date in the Japanese era may be converted to a date in the Christian era prior to step S62.

In step S64, the CPU 11 compares the number of characters (a "character count") of the current bibliographic element of the identified item in the application document with the character count of the corresponding bibliographic element given in the attached document (step S64). If the character counts of the two bibliographic elements match ("Match"), the CPU 11 advances to step S65, and if not ("Do not match"), to step S72 of FIG. 8B.

In step S72 of FIG. 8B, the CPU 11 generates two images: (i) an image of a non-matching character series in the current bibliographic element of the identified item in the application document; and (ii) an image of a non-matching character series in the corresponding bibliographic element given in the attached document.

The CPU 11 aligns an aspect ratio of one of the two generated images to an aspect ratio of the other of the two generated images, and compares the two images (step S73). In step S74, if the difference between the two images are within a range between −20% and +20% ("Yes"), the CPU 11 determines that the pair of bibliographic elements have an "alert" status (step S76), and advances to step S71 of FIG. 8A. If the difference between the two images exceeds the range between −20% and +20% ("No"), the CPU 11 determines that the pair of bibliographic elements have an "error" status (step S75), and advances to step S71 of FIG. 8A.

Figure 10:
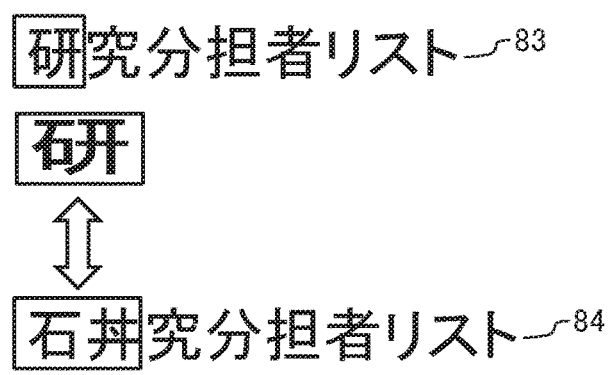
FIG. 10 illustrates an example of an operation comparing non-matching character series in terms of appearance.

FIG. 10 is an example of non-matching character series. The figure illustrates how, when comparing an attached document title 83 "研究分担者リスト" ("List of Investigators") with a second attached document title 84 "石井究分担者リスト" (a nonsensical character string), the characters "研" and "石井" form non-matching character series. Through rendering of the non-matching characters, the CPU 11 generates images of "研" and "石井", aligns the aspect ratio of the generated images, extracts feature points of the two images such as a line intersection, proximal end of a line, or distal end of a line, and compares these feature points. Through this comparison, the CPU 11 is able to determine the closeness of character strings in terms of their appearance.

Although the example of FIG. 10 shows a case where one of the non-matching character series consists of a single non-matching character, cases where both non-matching character series consisting of multiple non-matching characters are possible, and comparison can be made in the same way as mentioned above in order to determine the closeness of character strings in terms of their appearance.

Note also that, although the example of FIG. 10 shows a case for Chinese characters, non-matching character series can arise in character strings of other writing systems as well. For example, ligatures, inappropriate spacing between characters, and character elision can give rise to non-matching character series in character strings that contain the Latin alphabet.

Figure 9:
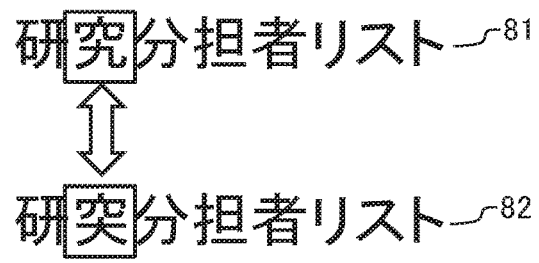
FIG. 9 illustrates an example of an operation comparing non-matching characters in terms of appearance.

Returning to FIG. 8A, in step S65, the CPU 11 compares a non-matching character in the current bibliographic element of the identified item in the application document with a non-matching character in the corresponding bibliographic element in the attached document in terms of images. FIG. 9 illustrates an example of mismatched characters. The figure indicates how, when comparing an attached document title 81 "研　究分担者リスト" ("List of Investigators") with a second attached document title 82 "研　突分担者リスト" (a nonsensical character string), the characters "究" and "突" become non-matching characters. Through rendering of the non-matching characters, the CPU 11 generates images of "究" and "突", extracts feature points from the two images such as a line intersection, a proximal end of a line, or a distal end of a line, and compares these feature points. Through this comparison, the CPU 11 is able to determine the closeness of character strings in terms of their appearance.

In step S66, if the difference between the two images are within a range between −10% and +10% ("Yes"), the CPU 11 determines that the pair of bibliographic elements have a "warning" status (step S67), and advances to step S71. If the difference between the two images exceeds the range between −10% and +10% ("No"), the CPU 11 proceeds to step S68.

In step S68, if the difference between the two images are within the range between −20% and +20% ("Yes"), the CPU 11 determines that the pair of bibliographic elements have an "alert" status (step S69), and advances to step S71. If the difference between the two images exceeds the range between −20% and +20% ("No"), the CPU 11 determines that the pair of bibliographic elements have an "error" status (step S70), and advances to step S71.

The CPU 11 compares images of non-matching characters and determines a status representing a level of agreement in accordance with the difference between the images. In this way, it is possible to determine how similar a bibliographic element of an attached document in an application document and a corresponding bibliographic element in the corresponding attached document are in terms of appearance.

In step S71, the CPU 11 determines whether the character strings of all types (a clinical research title, an attached document title, a prepared date, and a version number) have been processed. If there are any unprocessed character strings, the CPU 11 returns to step S60. If all the character string types have been processed, the CPU 11 ends the process of FIG. 8A.

Even when both an application document and an attached document are document files, the level of agreement between the two documents concerning bibliographic information is determined through character-string-assessment postliminary process. Through this process, it is possible to determine how similar a bibliographic element of an attached document in an application document and a corresponding bibliographic element in the corresponding attached document are in terms of appearance.

Note that although the process of FIG. 8A uses a range between −10% and +10% and a range between −20% and +20% to determine the status of a pair of bibliographic elements, other values may be used as threshold values.

FIG. 11 illustrates a relationship between misrecognition status and output contents.

The CPU 11 prepares a result and feedback comment based on both an OCR status and an assessment status of a character string that has been read in ("character string status" in FIG. 11). As shown in the legend, a white circle in the figure indicates that there is an output, a cross indicates no output, and a black circle indicates an output and a feedback to OCR.

There are three possible OCR statuses: noise, distortion, and keystone effect.

More specifically, if the character-string-assessment precursory process has given an "OK" status, regardless of the OCR status, a character string resulting from the precursory process is output, but no feedback comment is output.

If the character-string-assessment precursory process gave a "warning" status or an "alert" status, regardless of the OCR status, the CPU 11 outputs a character string resulting from the precursory process. Furthermore, when this character string is manually corrected, the CPU 11 makes the OCR learn from the correction and also outputs a feedback comment.

The CPU 11 learns the corrected character of the character string that has been entered by a user, and furthermore registers the corrected character in the common character error database 171 so that this registered information can be used by the character-string-assessment precursory process to replace a character resulting from misrecognition with an original character.

During this process, the CPU 11 determines the accuracy of OCR with parameters such as the proportion of characters that was determined to be typographical symbols within one or more character strings read from an image data by OCR and the OCR status such as noise, keystone effect, and distortion. If the accuracy of OCR is lower than a specific value, the CPU 11 prevents the OCR and the CPU 11 itself from learning from the misrecognition result. In this way, when the condition of an image data obtained from scanning a document is not satisfactory, the CPU 11 avoids learning from a misrecognition result arising from a cause such as noise.

If the OCR status is noise, the CPU 11 outputs the message, "Unwanted specks detected on scanned image. Clean scanner glass."

If the OCR status is distortion, the CPU 11 outputs the message, "Scan document by placing it flat against the scanner."

If the OCR status is keystone effect, the CPU 11 outputs the message, "Place document so it is not tilted."

If the character-string-assessment precursory process gave an "error" status or a "not subject to processing" status, regardless of the OCR status, a character string resulting from the precursory process is output and a feedback comment is output.

If the character-string-assessment postliminary process gave an "OK" status, regardless of the OCR status, a character string resulting from the character-string-assessment precursory process is output but a feedback comment is not output.

If the character-string-assessment postliminary process gave either a "warning" status, an "alert" status, or an "error" status, regardless of the OCR status, a character string resulting from the character-string-assessment precursory process is output as well as a feedback comment.

FIG. 12 illustrates an example of an on-screen result form 7. The on-screen result form 7 is displayed when the step S28 process of FIG. 6B is executed.

The on-screen result form 7 shows (i) bibliographic information in an application document for a listed attached document, (ii) corresponding bibliographic information given on the cover page of an attached document that corresponds to the listed attached document, and (iii) a result of a determined level of agreement between the corresponding bibliographic information.

At the top of the on-screen result form 7, a "result" field 71, an "application document title" field 72, and a "supplementary material" field 79 are shown. The "result" field 71 indicates the result of a determined level of agreement, and is given as "OK" in FIG. 12. The "application document title" field 72 indicates an application document title, and is given as "新規審査依頼書" ("New Request for Review") in FIG. 12. The "supplementary material" field 79 is given as "Supplementary material provided" in FIG. 12.

Below the abovementioned fields, the on-screen result form 7 shows (i) bibliographic elements in an application document for a listed attached document, and (ii) corresponding bibliographic elements given on the cover page of an attached document that corresponds to the listed attached document. The two sets of bibliographic elements are displayed so that a comparison can be made.

The "type" column 73 provides the names of bibliographic elements. In the on-screen result form 7 of FIG. 12, four types of bibliographic elements are given on separate lines: "clinical research title", "attached document title", "prepared date", and "version number".

The result form displays two columns of bibliographic element fields. The first column of bibliographic element fields 74 shows individual bibliographic elements given in an application document for a listed attached document. Any of the fields belonging to the first column of bibliographic element fields 74 can be modified manually.

The first column of precursory process results 75 indicates the status, as determined by the character-string-assessment precursory process, of each bibliographic element in an application document for a listed attached document that has been recognized by OCR.

The second column of bibliographic element fields 76 gives bibliographic elements given on the cover page of an attached document that corresponds to the attached document title of the first column of bibliographic element fields 74. Any of the fields belonging to the second column of bibliographic element fields 76 can be modified manually. When a field belonging to the first column of bibliographic element fields 74 or the second column of bibliographic element fields 76 is modified, the CPU 11 makes the OCR learn the character before correction and the character after correction. In this way, it is possible for the OCR to improve its level of accuracy further.

The second column of precursory process results 77 indicates the status, as determined by the character-string-assessment precursory process, of each bibliographic element given on the cover page of the attached document that has been recognized by OCR.

The postliminary process results column 78 indicates the level of agreement, as determined by the character-string-assessment postliminary process, between (i) a bibliographic element in the first column of bibliographic element fields 74 and (ii) a bibliographic element in the second column of bibliographic element fields 76 of each line.

The result given in the "result" field 71 is obtained by taking into account the results of the postliminary process results column 78. For example, the "result" field 71 displays the worst result given in the postliminary process results column 78.

When character strings do not match, the corresponding field in the postliminary process results column 78 indicates a determined level of similarity between the character strings in terms of appearance.

When two matching character strings have been correctly recognized by OCR, the relevant field in the postliminary process results column 78 shows an "OK" status. When either or both of two matching character strings are misrecognized by OCR, because the character strings are similar in appearance, the relevant field in the postliminary process results column 78 shows a "warning" or "alert" status. In other words, when either or both of two matching character strings are misrecognized by OCR, the postliminary process results column 78 is able to inform a user that there is similarity in terms of appearance.

In contrast to the above, when two non-matching character strings are correctly recognized by OCR, it is expected that the difference between non-matching characters in terms of image exceeds a range between −20% and +20%, resulting in the relevant field in the postliminary process results column 78 to indicate an "error" status. Further still, when two non-matching character strings are misrecognized by OCR, it is expected that the difference between non-matching characters in terms of image exceeds the range between −20% and +20% resulting in the relevant field in the postliminary process results column 78 to indicate an "error" status. In this way, the postliminary process results column 78 is able to inform a user that the two character strings are widely different from each other in terms of appearance.

MODIFICATIONS

Although the present invention has been described in detail with reference to the above embodiments, other versions are possible within the spirit and scope of the present invention. Examples of modifications are as follows.

(a) The above embodiment has been described using an example of a cloud system for reducing paperwork concerning drug research and development. However, embodiments are not limited to systems concerning drug research and development. Other versions of a system for submitting an application document, including a request form, together with a set of attached documents are possible.

(b) In the above embodiment, operations where non-matching characters are compared as images have been described using written symbols that are used in the Japanese writing system as examples. The disclosure is not limited to written symbols used in the Japanese language, and may be used with characters of other writing systems such as letters of the Latin alphabet.

(c) The above embodiment compares two images rendered from non-matching characters. In other embodiments, image data prior to OCR may be used to cut out respective parts from the image data that correspond to where the non-matching characters are located, so that the cut out parts of the two images are compared with each other.

(d) The above embodiment compares feature points such as a line intersection, proximal end of a line, and distal end of a line extracted from rendered images of non-matching characters. However, the present invention is not limited to such comparison of features. Versions may extract topological information of lines from images rendered from non-matching characters and compare the topological information of the rendered images.

Topological information of an arc or other topological structures may also be extracted for the purpose of comparison.

What is claimed is:

1. A documentation determination device comprising:
a recognition unit; and
a control unit, wherein
an application document and attached documents are input data to the documentation determination device, wherein
in the application document, a list of the attached documents is provided, wherein
each listed item in the list of the attached documents includes first bibliographic information of an attached document, wherein
when the application document, one or more of the attached documents linked to the application document, or both the application document and one or more of the attached documents linked to the application document are image data, the recognition unit is configured to recognize character information from the image data, wherein
the control unit is configured to
(i) acquire the first bibliographic information for each listed item in the application document, (ii) acquire second bibliographic information of an attached document given in each of the attached documents, (iii) determine a level of agreement between the second bibliographic information of each of the attached documents and the first bibliographic information of a corresponding listed item in the list of attached documents, and (iv) report, for each of the attached documents, (a) the second bibliographic information, (b) the first bibliographic information of the corresponding listed item, and (c) the level of agreement between the second bibliographic information and the first bibliographic information of the corresponding listed item, wherein when a second character string of the second bibliographic information of one of the attached documents and a first character string of the first bibliographic information of a corresponding listed item in the list of attached documents do not match, the control unit is configured to
(i) generate a pair of images through rendering, one image rendered from at least one non-matching character in the first character string and another image rendered from at least one non-matching character in the second character string, and
(ii) compare the pair of images to determine a level of agreement between the pair of images.

2. The documentation determination device according to claim 1, wherein
when the first character string and the second character string have different lengths, the control unit is further configured to
(i) generate a first image through rendering a non-matching character series in either one of the first character string and the second character string,
(ii) generate a second image through rendering a non-matching character in another one of the first character string and the second character string,
(iii) align an aspect ratio of the first image and the second image, and
(iv) compare and determine a level of agreement between the first image and the second image.

3. The documentation determination device according to claim 1, wherein
the control unit is further configured to
(i) extract a feature point from each of the pair of images, and
(ii) compare the feature points of the pair of images, wherein
the feature point is a line intersection, a proximal end of a line, or a distal end of a line.

4. The documentation determination device according to claim 1, wherein
the control unit is configured to
(i) extract topological information of a line from each of the pair of images, and
(ii) compare the topological information of the pair of images.

5. The documentation determination device according to claim 1, further comprising
a database configured to store erroneous characters that frequently appear when character information is recognized from image data and corresponding correct characters, wherein
when a recognition result output by the recognition unit contains a first character that is one of the erroneous characters stored in the database, the control unit is configured to replace the first character with a corresponding one of the correct characters stored in the database, and wherein
when a typographical symbol appears in place of where an alphabetical character, a syllabary, a Chinese character, or a numeral should be in the recognition result output by the recognition unit and if an applicable word can be deduced for the typographical symbol, the typographical symbol and a character replacing the typographical symbol are registered in the database.

6. The documentation determination device according to claim 1, wherein
the bibliographic information comprises a first element, wherein
the first element is a document title, a prepared date, or a version number, and wherein
the control unit is configured to compare the first element in the second bibliographic information of each of the attached documents with the first element in the first bibliographic information of a corresponding listed item in the list of attached documents to determine a level of agreement of bibliographic information for each of the attached documents.

7. A documentation determination device comprising:
a recognition unit; and
a control unit, wherein
an application document and attached documents are input data to the documentation determination device, wherein
in the application document, a list of the attached documents is provided, wherein
each listed item in the list of the attached documents includes first bibliographic information of an attached document, wherein
when the application document and the attached documents linked to the application document are image data, the recognition unit is configured to recognize character information from the image data, wherein
the control unit is configured to
(i) acquire the first bibliographic information for each listed item in the application document,
(ii) acquire second bibliographic information of an attached document given in each of the attached documents,
(iii) determine a level of agreement between the second bibliographic information of each of the attached documents and the first bibliographic information of a corresponding listed item in the list of attached documents, and
(iv) report, for each of the attached documents, (a) the second bibliographic information, (b) the first bibliographic information of the corresponding listed item, and (c) the level of agreement between the second bibliographic information and the first bibliographic information of the corresponding listed item, wherein
when a second character string of the second bibliographic information of one of the attached documents and a first character string of the first bibliographic information of a corresponding listed item in the list of attached documents do not match, the control unit is configured to
(i) generate one cut out from one of the image data corresponding to at least one non-matching character in the first character string, (ii) generate another cut out from another one of the image data at least one non-matching character in the second character string, and
(iii) compare the two cut outs and determine a level of agreement between the two cut outs.

8. A non-transitory computer-readable storage medium storing a documentation determination program wherein
when an input application document, one or more of input attached documents linked to the application document, or both the application document and one or more of the attached documents linked to the application document are image data, wherein a list of the attached documents is provided in the application document and each listed item in the list of the attached documents includes first bibliographic information of an attached document, the documentation determination program enables a computer to execute processing comprising:
(i) recognizing character information from the image data,
(ii) acquiring the first bibliographic information for each listed item in the application document,
(iii) acquiring second bibliographic information of an attached document given in each of the attached documents,
(iv) determining a level of agreement between the second bibliographic information of each of the attached documents and the first bibliographic information of a corresponding listed item in the list of attached documents,
(v) reporting, for each of the attached documents, (a) the second bibliographic information, (b) the first bibliographic information of the corresponding listed item, and (c) the level of agreement between the second bibliographic information and the first bibliographic information of the corresponding listed item, further wherein
when a second character string of the second bibliographic information of one of the attached documents and a first character string of the first bibliographic information of a corresponding listed item in the list of attached documents do not match, the documentation determination program enables a computer to perform the acts of:
(i) generating a pair of images through rendering, one image rendered from at least one non-matching character in the first character string and another image rendered from at least one non-matching character in the second character string, and
(ii) comparing the pair of images to determine a level of agreement between the pair of images.

\* \* \* \* \*